United States Patent
Liu et al.

(10) Patent No.: US 10,519,531 B2
(45) Date of Patent: Dec. 31, 2019

(54) LIGHTWEIGHT DUAL-PHASE ALLOYS

(71) Applicant: GM GLOBAL TECHNOLOGY OPERATIONS LLC, Detroit, MI (US)

(72) Inventors: Zhongyi Liu, Troy, MI (US); Frederick E. Pinkerton, Shelby Township, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 338 days.

(21) Appl. No.: 15/436,198

(22) Filed: Feb. 17, 2017

(65) Prior Publication Data

US 2018/0237890 A1 Aug. 23, 2018

(51) Int. Cl.
| | | |
|---|---|---|
| *C22C 30/00* | (2006.01) | |
| *C22C 1/04* | (2006.01) | |
| *B33Y 70/00* | (2015.01) | |
| *B22F 9/04* | (2006.01) | |

(52) U.S. Cl.
CPC ............. *C22C 30/00* (2013.01); *B33Y 70/00* (2014.12); *C22C 1/0408* (2013.01); *B22F 2009/043* (2013.01); *C22C 2200/00* (2013.01)

(58) Field of Classification Search
CPC .... C22C 1/1084; C22C 1/0408; C22C 1/0416
See application file for complete search history.

(56) References Cited

U.S. PATENT DOCUMENTS

| | | | |
|---|---|---|---|
| 7,465,333 B1 | 12/2008 | Halalay et al. | |
| 7,919,174 B2 | 4/2011 | Ruokolainen et al. | |
| 8,052,224 B2 | 11/2011 | Luo et al. | |
| 8,328,971 B2 | 12/2012 | Kia et al. | |
| 2009/0226755 A1 | 9/2009 | Sigler et al. | |
| 2010/0092790 A1 | 4/2010 | Luo et al. | |
| 2010/0290942 A1 | 11/2010 | Becker et al. | |
| 2011/0115599 A1* | 5/2011 | Otsuki | H01F 1/26 336/221 |
| 2012/0196147 A1* | 8/2012 | Rabiei | B22F 3/1112 428/613 |
| 2013/0121869 A1 | 5/2013 | Kulkarni et al. | |
| 2014/0030544 A1* | 1/2014 | Maki | C21D 1/673 428/632 |
| 2015/0354032 A1* | 12/2015 | Yuan | C22C 21/04 420/534 |
| 2017/0136697 A1 | 5/2017 | Kia et al. | |
| 2017/0136698 A1 | 5/2017 | Kia et al. | |
| 2017/0298479 A1* | 10/2017 | Donahue | C22C 21/04 |

OTHER PUBLICATIONS

Seong Woo Kim, et al., "Removal of Primary Iron Rich Phase from Aluminum-silicon melt by centrifugal separation"; Overseas Foundry, vol. 10, No. 2; Mar. 2013; pp. vol. 10, No. 2, Mar. 2013; pp. 112-117.

* cited by examiner

*Primary Examiner* — Ngoc-Yen Nguyen
(74) *Attorney, Agent, or Firm* — Quinn IP Law

(57) ABSTRACT

According to aspects of the present disclosure, a ternary alloy includes a dual-phase microstructure including a first phase and a second phase. The first phase defines a hexagonal close-packed structure with a stoichiometric ratio of $Al_4Fe_{1.7}Si$. The second phase defines a face-centered cubic structure with a stoichiometric ratio of $Al_3Fe_2Si$. The dual-phase microstructure is stable above about 800° C., and the dual-phase microstructure has a first-phase abundance greater than about 50 parts by weight and a second-phase abundance less than about 50 parts by weight based on 100 parts by weight of the ternary alloy.

18 Claims, No Drawings

LIGHTWEIGHT DUAL-PHASE ALLOYS

INTRODUCTION

The disclosure relates to the field of lightweight alloys and, more specifically, to dual-phase Al—Fe—Si alloys.

Steel and titanium alloys have been used in the manufacturing of vehicles. These alloys provide high temperature strength, but they can be heavy and/or expensive. Components made of lightweight metals have been investigated in vehicle manufacturing, where continual improvement in performance and fuel economy is desirable. Some examples of lightweight metals include aluminum and/or magnesium alloys. However, industry standards and limitations during the formation process may dictate which alloy materials and alloying constituents are selected. Alloy selection may ultimately be tailored to the microstructural properties that are desirable for the component being formed and based on what can be achieved during the formation process conditions.

SUMMARY

It is desirable to form lightweight Al—Fe—Si alloys with optimized durability.

According to aspects of the present disclosure, an alloy includes a dual-phase microstructure consisting of aluminum, iron, and silicon, the dual-phase microstructure includes a first phase and a second phase. The first phase defines a hexagonal close-packed structure with a stoichiometric ratio of $Al_4Fe_{1.7}Si$. The second phase defines a face-centered cubic structure with a stoichiometric ratio of $Al_3Fe_2Si$. The dual-phase microstructure is stable above about 800° C., and the dual-phase microstructure has a first-phase abundance greater than about 50 parts by weight and a second-phase abundance less than about 50 parts by weight based on 100 parts by weight of the alloy.

According to further aspects of the present disclosure, the dual-phase microstructure is stable below about 1000° C.

According to further aspects of the present disclosure, the dual-phase microstructure is produced uses additive manufactures.

According to further aspects of the present disclosure, the alloy is produced uses ball mills, hot pressing, and sinters.

According to further aspects of the present disclosure, the first phase has a first lattice constant of about 0.75 nm and a second lattice constant of about 0.76 nm.

According to further aspects of the present disclosure, the second phase has a first lattice constant of about 1.08 nm.

According to further aspects of the present disclosure, the first phase is approximately 75 parts by weight of the alloy and the second phase is approximately 25 parts by weight of the alloy.

According to aspects of the present disclosure, a method includes obtaining a first phase consisting of aluminum, iron, and silicon, obtaining a second phase consists of aluminum, iron, and silicon, and combining the first phase and the second phase using solid-state processing to produce an alloy including a dual-phase microstructure. The first phase defines a hexagonal close-packed structure. the first phase has a stoichiometric ratio of $Al_4Fe_{1.7}Si$. The second phase defines a face-centered cubic structure. The second phase has a stoichiometric ratio of $Al_3Fe_2Si$. The dual-phase microstructure has a first-phase abundance greater than about 50 parts by weight and a second-phase abundance less than about 50 parts by weight based on 100 parts by weight of the alloy.

According to further aspects of the present disclosure, the method further includes milling, prior to combining the first phase and the second phase, the first phase and the second phase to obtain a first-phase powder and a second-phase powder.

According to further aspects of the present disclosure, combining the first phase and the second phase is accomplished uses hot pressing and sinters.

According to further aspects of the present disclosure, the first phase has a first lattice constant of about 0.75 nm and a second lattice constant of about 0.76 nm and the second phase has a first lattice constant of about 1.08 nm.

According to further aspects of the present disclosure, combines the first phase and the second phase is accomplished uses additive manufactures.

According to further aspects of the present disclosure, the first phase is approximately 75 parts by weight and the second phase is approximately 25 parts by weight based on 100 parts by weight of the alloy.

According to aspects of the present disclosure, a vehicle component consists of a ternary alloy. The ternary alloy includes a dual-phase microstructure including a first phase and a second phase. The first phase defines a hexagonal close-packed structure having a stoichiometric ratio of $Al_4Fe_{1.7}Si$. The second phase defines a face-centered cubic structure having a stoichiometric ratio of $Al_3Fe_2Si$. The dual-phase microstructure is stable below about 800° C., and the dual-phase microstructure has a first-phase abundance greater than about 50 parts by weight and a second-phase abundance less than about 50 parts by weight.

According to further aspects of the present disclosure, the dual-phase microstructure is stable below about 1000° C.

According to further aspects of the present disclosure, the dual-phase microstructure is produced uses powder metallurgy.

According to further aspects of the present disclosure, the alloy is produced uses ball mills, hot pressing, and sinters.

According to further aspects of the present disclosure, the first phase has a first lattice constant of about 0.75 nm and a second lattice constant of about 0.76 nm.

According to further aspects of the present disclosure, the second phase has a first lattice constant of about 1.08 nm.

According to further aspects of the present disclosure, the first phase is approximately 75 parts by weight and the second phase is approximately 25 parts by weight based on 100 parts by weight of the alloy.

The above features and advantages and other features and advantages of the present disclosure are readily apparent from the following detailed description when taken in connection with the accompanying drawings.

DETAILED DESCRIPTION

Aluminum, iron, and silicon are relatively abundant materials. Theoretically, iron aluminides (e.g., quasi-equilibrium cubic $Al_xFe_ySi_z$ ternary phases) have extreme properties at densities approaching titanium (e.g., less than 5 g/cm$^3$), but with costs that are an order of magnitude less than titanium. For example, cubic $Al_xFe_ySi_z$ phases have exceptional stiffness, high temperature strength, ductility (e.g., at least 5 slip systems in the crystal structure, where there are 12 slip systems in face-centered cubic (FCC) structures and up to 48 slip systems in body-centered cubic (BCC) systems), and tensile strength at room temperature (e.g., greater than or equal to 450 MPa). These phases also have high oxidation resistance due to the presence of large amounts of aluminum. Beneficially, properties of the resulting ternary alloy can be optimized by combining different phases of the ternary alloy to produce a lightweight dual-phase alloy including a dual-phase microstructure.

One stabilized high-symmetry lightweight phase of interest is $\tau_{10}$ or $\tau_{11}$, which refer to the same phase with the formula $Al_xFe_ySi_z$, where x ranges from about 4 to about 5, y ranges from about 1.5 to about 2.2, and z is about 1. The $\tau_{10}$ or $\tau_{11}$ phase can be represented by a formula of $Al_4Fe_{1.7}Si$ or $Al_5Fe_2Si$, which are generally interchangeable to reflect the compositional range of the phase. Crystallographic data for these phases has lattice parameters of a=0.7509 nm and c=0.7594 nm (the a/c ratio is almost 1, indicating that the structure is close to a distorted FCC phase). A space group for these phases is P63/mmc and the Pearson symbol is hP28. A structure type of the stable $\tau_{10}$ or $\tau_{11}$ phase is a $Co_2Al_5$ type or a distorted FCC. The density of these phases is about 4.1 g/cm$^3$. Another stabilized lightweight phase of interest is $\tau_{12}$, which has the formula $Al_3Fe_2Si$. Crystallographic data for this phase has lattice parameters of a=b=c=1.0806 nm. A space group for this phase is Fd-3m. A structure type of this phase is a $NiTi_2$ type, and the Pearson symbol for this type is cF96.

The formation of such stable $Al_xFe_ySi_z$ phases in the iron-aluminum-silicon materials systems can be challenging, in part because the iron-aluminum-silicon material system has at least 11 ternary phases (a select few of which are cubic and stable at high temperatures) and because the stable cubic phases occur within a narrow processing window. For example, the $Al_4Fe_{1.7}Si$ phase is a high-temperature phase which is stable between 727° C. and 997° C. Stabilization of the $Al_4Fe_{1.7}Si$ phase at room temperature requires rapid solidification of the melt. The available cooling rates are about 102 K/s and about 105 K/s achieved by water-cooled crucible solidification and melt-spinning, respectively. At these cooling rates, the material formed generally does not have the desirable $Al_4Fe_{1.7}Si$ phase as the predominant phase. Moreover, the composition range of the $Al_4Fe_{1.7}Si$ phase is small (wt %): Al (66-64.5), Fe (~24.5), Si (9.5-11) and a small fluctuation in composition will change the solidification path, creating an unwanted microstructure.

The method(s) disclosed herein utilize a solid-state reaction to generate stabilized lightweight ternary phases of interest in the aluminum-iron-silicon system. In particular, the method(s) may be used to generate alloys of the stable $Al_xFe_ySi_z$ phase, wherein x ranges from about 3 to about 5, y ranges from about 1.5 to about 2.2, and z is about 1. Beneficially, these stable $Al_xFe_ySi_z$ phases reduce cost, weight, or both when compared to other high-temperature application alloys including titanium aluminides, nickel-based superalloys, and cobalt-based superalloys.

The solid-state reaction is a relatively low-temperature process (e.g., from about 100° C. to about 120° C.), especially in comparison to processes that melt the starting or precursor materials at temperatures at or above 1250° C. (the melting point of stoichiometric compositions of Al, Fe and Si within the desired composition range). The low temperature process disclosed herein utilizes starting materials in solid form, and thus eliminates the high temperature solidification process from the molten state during which other phases can form.

To perform the solid-state reaction, ball milling is utilized. Ball milling strikes the starting materials together energetically between rapidly moving milling media (e.g., milling balls), or between a milling medium and the wall of the milling vessel, in order to achieve atomic mixing and/or mechanical alloying.

The method includes providing aluminum, iron, and silicon starting materials. One or more of the starting materials may be in powder form. For example, elemental aluminum powder, elemental iron powder, and elemental silicon powder may be used. The aluminum powder may be at least 99% pure aluminum. An example aluminum powder, which is 99.5% aluminum, is available from Alfa Aesar. The iron powder may be at least 97% pure iron. An example iron powder, which is 97% iron, is available from J.T. Baker. The silicon powder may be at least 99% pure silicon. An example silicon powder, which is 99.5% silicon, is available from Alfa Aesar. Since the starting materials are substantially pure, the resulting phases have trace amounts (e.g., 4.5%) of other alloying elements.

When it is desirable to form the $Al_xFe_ySi_z$ phase, where x ranges from about 4 to about 5, y ranges from about 1.5 to about 2.2, and z is about 1, the starting materials may include from about 41 wt % to about 55 wt % aluminum based on the total wt % of the starting materials, from about 33 wt % to about 48 wt % iron based on the total wt % of the starting materials, and from about 9 wt % to about 13 wt % silicon based on the total wt % of the starting materials.

When it is desirable to form the $Al_xFe_ySi_z$ phase, where x is equal to 3, y is equal to 2, and z is equal to 1, the starting materials may include from about 36 wt % to about 37 wt % aluminum based on the total wt % of the starting materials, from about 50 wt % to about 51 wt % iron based on the total wt % of the starting materials, and from about 12 wt % to about 13 wt % silicon based on the total wt % of the starting materials.

The powders may separately be added to the ball mill, or may be combined together, and then the combined powder may be added to the ball mill.

Ball milling may be accomplished using any suitable high energy ball milling apparatus. Examples of high energy ball milling apparatuses include conventional ball mills (which move the entire drum, tank, jar, or other milling vessel containing the milling media and the starting materials in a rotary or oscillatory motion) and attritors (which stir the milling media and starting materials in a stationary tank with a shaft and attached arms or discs). An example of a conventional ball mill includes the SPEX SamplePrep 8000M MIXER/MILL®. The drum, tank, jar, or other milling vessel of the ball milling apparatus may be formed of stainless steel, hardened steel, tungsten carbide, alumina ceramic, zirconia ceramic, silicon nitride, agate, or another suitably hard material. In an example, the ball mill drum, tank, jar, or other milling vessel may be formed of a material that the aluminum starting material will not stick to.

Ball milling may be accomplished with any suitable milling or grinding media, such as milling balls. The milling media may be stainless steel balls, hardened steel balls, tungsten carbide balls, alumina ceramic balls, zirconia ceramic balls, silicon nitride balls, agate balls, or another suitably hard milling medium. The milling media may include at least one small ball (having a diameter ranging from about 3 mm to about 7 mm) and at least one large ball (having a diameter ranging from about 10 mm to about 13 mm). In an example, the ratio of large balls to small balls is 1:2. As one example, the grinding media includes two small balls, each of which has a diameter of about 6.2 mm, and one large ball having a diameter of about 12.6 mm. The number of large and small balls, as well as the size of the balls, may be adjusted as desired.

The milling media may be added to the ball-mill drum, tank, jar, or other milling vessel before or after the starting materials are added.

Ball milling may be accomplished in an environment containing a non-reactive gas. In an example, the non-reactive gas is an inert gas, such as argon, helium, or neon. Another suitable non-reactive gas may be nitrogen gas. Air, oxygen, and the like may not be suitable due to the fact that these gases can readily form oxides on the surface of the starting materials.

Ball milling may be performed at a speed and for a time that are sufficient to generate the desirable $Al_xFe_ySi_z$ phase. In an example, the speed of ball milling may be about 1060 cycles/minute (115 V mill) or 875 cycles/minute (230 V mill). In an example, the time for which ball milling may be performed ranges from about 8 hours to about 32 hours. The time may vary depending upon the amount of starting materials used and the amount of the phase that is to be formed. As one example, ball milling may be performed for about 16 hours to form 1 gram of the $Al_4Fe_{1.7}Si$ or $Al_5Fe_2Si$ phase. As another example, ball milling may be performed for 32 hours to form 3 grams of the $Al_4Fe_{1.7}Si$ or $Al_5Fe_2Si$ phase.

In some aspects, a liquid medium is added to the ball mill with the grinding media and the starting materials. In this example, the starting materials are ball milled in the presence of the grinding media as well as the liquid medium. The liquid medium may be added to prevent malleable metal (e.g., aluminum) from becoming permanently pressed against, or adhered/stuck to, the walls of the ball mill drum, tank, jar, or other milling vessel. Any liquid medium that will not oxidize the metal starting materials may be used. In an example, an anhydrous liquid medium may be used. Examples of the anhydrous liquid medium include linear hydrocarbons, such as pentane, hexane, heptane, or another simple liquid hydrocarbon. Anhydrous cyclic or aromatic hydrocarbons may also be used. Anhydrous liquid media may be particularly desirable because they are devoid of oxygen (e.g., do not contain any oxygen atoms). Other suitable liquid media may include fluorinated solvents or stable organic solvents whose oxygen atoms will not oxidize the metal starting materials.

The use of the liquid medium may also facilitate uniform mixing and alloying among the aluminum, iron and silicon during the formation of the alloy. The liquid medium may ensure that the desired phase is formed (as starting material is not lost throughout the process) and may also improve the yield of the desired phase.

The ratio of total starting materials to liquid media may range from 1:5 to 1:10 by volume.

The method disclosed herein forms stable $Al_xFe_ySi_z$ phase alloys, wherein x ranges from about 3 to about 5, y ranges from about 1.5 to about 2.2, and z is about 1. The resulting alloy predominantly has the desired stable phase(s), which provide exceptional high temperature properties with high oxidation resistance due, in part, to the high amount of aluminum. Moreover, quasi-equilibrium $Al_xFe_ySi_z$ ternary phases have exceptional stiffness and high temperature strength.

The qualities of the stable $Al_xFe_ySi_z$ phase alloys render them suitable for components of an automobile or other vehicle (e.g., motorcycles, boats). As examples, the stable $Al_xFe_ySi_z$ phase alloys may be suitable for forming lighter engine valves or other lightweight valves, for forming lightweight pistons, for forming rotating and reciprocating parts of an internal combustion engine, and/or for use in turbocharger applications (e.g., forming turbocharger wheels). The stable $Al_xFe_ySi_z$ phase alloys may also be used in a variety of other industries and applications, including, as non-limiting examples aerospace components, industrial equipment and machinery, farm equipment, and/or heavy machinery. Forming components from the stable $Al_xFe_ySi_z$ phase alloys disclosed herein may be accomplished using any suitable technique, such as rolling, forging, stamping, or casting (e.g., die casting, sand casting, permanent mold casting, etc.).

As used herein, the term high-strength means the alloy (or component formed therefrom) exhibits a tensile strength of greater than or equal to about 450 MPa. As examples, the tensile strength may be greater than or equal to about 500 MPa, greater than or equal to about 900 MPa, greater than or equal to about 1,300 MPa, or greater than or equal to about 1,600 MPa.

Also as used herein, the term lightweight means that the alloy forming the component has a density of less than or equal to about 5 g/cm³.

The high-strength, lightweight alloy further exhibits high stiffness and good stability and strength at high or elevated temperatures. High or elevated temperatures may be considered to be those that are greater than or equal to 800° C. High strength at an elevated temperature (e.g., greater than or equal to 800° C.) may be considered to be greater than or equal to 400 MPa, greater than or equal to 500 MPa, greater than or equal to 600 MPa, greater than or equal to 700 MPa, greater than or equal to 800 MPa, and in certain variations, greater than or equal to about 900 MPa. High stiffness at an elevated temperature (e.g., greater than or equal to 800° C.) may be considered to be a Young's modulus of greater than or equal to 110 GPa; greater than or equal to 120 GPa; greater than or equal to 130 GPa; greater than or equal to 140 GPa; greater than or equal to 150 GPa; and in certain variations, greater than or equal to 160 GPa. As examples, the Young's modulus for the $Al_4Fe_{1.7}Si$ and $Al_3Fe_2Si$ phases ranges from about 230 GPa to about 280 GPa.

As can be seen from the data above, the $Al_4Fe_{1.7}Si$ phase, defining a hexagonal close-packed structure, is a relatively hard phase and the $Al_3Fe_2Si$ phase, defining a face-centered cubic structure, is a relatively tough phase. Notably, the $Al_4Fe_{1.7}Si$ phase has a density of about 4.0 g/cm³ while the $Al_3Fe_2Si$ phase has a density of 4.35 g/cm³.

As can be seen, the hard phase has the lowest density phase of the number of phases. However, the hard phase is subject to crack initiation when impacted by a force and crack propagation thereafter. For example, a Vickers hardness test using a micro-indentation placing 4.9 N of force (300 g) on a surface of the hard phase with a pyramidal tip generates a crack extending from each of the four corners of the indentation. The total crack length is about 66.6 microns, with each crack being about 16.7 microns.

Beneficially, the tough phase is resistant to corrosion and inhibits propagation of cracks through the material. However, the density of the tough phase is about 10% higher than that of the hard phase. Beneficially, the hard phase can be alloyed with the tough phase to produce a dual-phase microstructure with optimized durability. The dual-phase microstructure maintains a density close to that of the hard phase while reducing the ability of cracks to propagate through the alloy.

In some aspects, the dual-phase microstructures described herein are stable below about 500 degrees Celsius. In some aspects, the dual-phase microstructures described herein are stable below about 1000 degrees Celsius.

It is believed that the interface between the first phase and the second phase inhibits or prevents propagation of cracks through the material. It is further believed that the microstructure of the second phase also inhibits crack propagation therethrough. For example, a dual-phase microstructure with a first-phase abundance of 75% and a second-phase abundance of 25% is subjected to a Vickers hardness test using a micro-indentation placing 4.9 N of force (300 g) on a surface of the alloy with a pyramidal tip generates a crack extending from each of the four corners of the indentation. The total crack length is about 52.6 microns. The individual lengths of each of the four cracks vary significantly. For example, the average crack length is about 13.15 microns with the longest crack being about 17 microns and the shortest crack being about 2 microns.

In another example, a dual-phase microstructure with a first-phase abundance of 50% and a second-phase abundance of 50% is subjected to a Vickers hardness test using a micro-indentation placing 4.9 N of force (300 g) on a surface of the alloy with a pyramidal tip generates a crack extending from each of the four corners of the indentation. The total crack length is about 40.2 microns. The individual lengths of each of the four cracks vary significantly. For example, the average crack length is about 10.05 microns with the longest crack being about 15 microns and the shortest crack being about 4 microns. As can be seen, as the relative abundance of the tough phase increases, the total crack length decreases.

The Vickers hardness was calculated for each of the above-described tests. The Vickers hardness for the hard phase is about 925. The Vickers hardness for the alloy having 75% relative abundance of the hard phase and 25% relative abundance of the tough phase is about 910. The Vickers hardness for the alloy having 50% relative abundance of the hard phase and 50% relative abundance of the tough phase is about 845.

The Fracture toughness for the dual-phase microstructure can be calculated using the Shetty model described in R. Spiegler et al., *Fracture Toughness Evaluation of WC—Co Alloys by Indentation Testing*, 1 J. Hard Mat'l 147 (1990), which is hereby incorporated by reference for the model described therein. The fracture toughness for the hard phase is about 2.0 MPam$^{1/2}$. The fracture toughness for the alloy having 75% relative abundance of the hard phase and 25% relative abundance of the tough phase is about 2.3 MPam$^{1/2}$. The fracture toughness for the alloy having 50% relative abundance of the hard phase and 50% relative abundance of the tough phase is about 2.6 MPam$^{1/2}$.

As can be seen, the relative abundances of the first phase and the second phase can be adjusted to achieve a desired balance of Vickers hardness, fracture toughness, and average density of the resulting alloy. Beneficially, an Al—Fe—Si alloy having a dual-phase microstructure with 75% relative abundance of the hard phase and 25% relative abundance of the tough phase decreases the Vickers toughness by about 1.6%, but increases the toughness by about 15%.

To further illustrate the present disclosure, an example is given herein. It is to be understood that this example is provided for illustrative purposes and is not to be construed as limiting the scope of the present disclosure.

EXAMPLE

Ball milling is used to form 1 gram of Al$_4$Fe$_{1.7}$Si, 3 grams of Al$_4$Fe$_{1.7}$Si, and 3 grams of Al$_3$Fe$_2$Si.

The starting materials are 99.5% pure aluminum powder from Alfa Aesar (Stock #11067, Lot# A26I27), 97% pure iron powder from J. T. Baker (Lot M47600), and 99.5% pure silicon powder from Alfa Aesar (Stock#12681, Lot# G08H24).

The starting materials for the 1 gram sample of Al$_4$Fe$_{1.7}$Si are shown in Table 1, below.

TABLE 1

| Element Targeted | Weight % Targeted | Targeted Weight (g) | Actual Weight (g) |
| --- | --- | --- | --- |
| Al | 46.73 | 0.4673 | 0.4679 |
| Fe | 41.10 | 0.4110 | 0.4106 |
| Si | 12.17 | 0.1217 | 0.1221 |

The starting materials for the 3 gram sample of Al$_4$Fe$_{1.7}$Si are shown in Table 2, below.

TABLE 2

| Element Targeted | Weight % Targeted | Targeted Weight (g) | Actual Weight (g) |
| --- | --- | --- | --- |
| Al | 46.73 | 1.4019 | 1.4010 |
| Fe | 41.10 | 1.2330 | 1.2335 |
| Si | 12.17 | 0.3651 | 0.3652 |

The starting materials for the 3 gram sample of Al$_3$Fe$_2$Si are shown in Table 3, below.

TABLE 3

| Element Targeted | Weight % Targeted | Targeted Weight (g) | Actual Weight (g) |
| --- | --- | --- | --- |
| Al | 36.68 | 1.1004 | 1.1007 |
| Fe | 50.57 | 1.5171 | 1.5176 |
| Si | 12.75 | 0.3825 | 0.3830 |

The 1 gram and 3 gram samples are weighed out, and the starting materials for each of the samples were introduced into respective ball milling jars.

Pentane (available from VWR International) is added to the respective ball milling jars and is used during ball milling of the 3 gram samples. The pentane is used to avoid sticking of the starting materials and to achieve better mixing of the starting materials. Pentane is not used for the 1 gram sample.

The grinding/milling media, which includes 3 balls (two small balls, each with a diameter of 6.20 mm, and one large ball with a diameter of 12.65 mm), are added to the respective ball milling jars.

Argon gas is used when the pentane and the milling media, or the milling media without pentane, were added to the jars.

Ball milling is then performed using the SPEX SamplePrep 8000M MIXER/MILL®. For the 1 gram sample, milling was accomplished for about 16 hours. For the 3 gram samples, milling was accomplished for about 32 hours.

After milling, the product from the 1 gram sample and the 3 gram samples is removed from the respective jars. Scanning electron microscope images are taken of each of the products, and it is observed that the 3 gram sample products, which were formed in the presence of pentane, are more uniform powders with a smaller particle size than the 1 gram sample product, which was formed without pentane.

X-ray diffraction is performed using a Bruker D8 Advance X-Ray diffraction system and a Rigaku X-ray Diffraction system to provide phase identification of the 1 gram and 3 gram sample of the Al$_4$Fe$_{1.7}$Si and the 3 gram sample of the Al$_3$Fe$_2$Si. The raw data from each Al$_4$Fe$_{1.7}$Si system matches the reference data for Al$_4$Fe$_{1.7}$Si hexagonal phase. The raw data from the Al$_3$Fe$_2$Si system matched the Al$_3$Fe$_2$Si reference data. Clearly, each of the sample products was formed of the desired Al$_4$Fe$_{1.7}$Si or Al$_3$Fe$_2$Si phases.

It is to be understood that the ranges provided herein include the stated range and any value or sub-range within the stated range. For example, a range from about 9 wt % to about 13 wt % should be interpreted to include not only the explicitly recited limits of about 9 wt % to about 13 wt %, but also to include individual values, such as 9.25 wt %, 12.3 wt %, etc., and subranges, such as from about 9.5 wt % to about 10.5 wt %, etc. Furthermore, when "about" is utilized to describe a value, this is meant to encompass minor variations (up to +/−10%) from the stated value.

While the best modes for carrying out the disclosure have been described in detail, those familiar with the art to which this invention relates will recognize various alternative designs and embodiments for practicing the disclosure within the scope of the appended claims.

The invention claimed is:

1. An alloy comprising:
a dual-phase microstructure consisting of aluminum, iron, and silicon, wherein the dual-phase microstructure has:
a first phase defining a hexagonal close-packed structure having a stoichiometric ratio of $Al_4Fe_{1.7}Si$, and
a second phase defining a face-centered cubic structure having a stoichiometric ratio of $Al_3Fe_2Si$,
wherein the dual-phase microstructure is stable above about 800° C., and wherein the dual-phase microstructure has a first-phase abundance greater than about 50 parts by weight and a second-phase abundance less than about 50 parts by weight based on 100 parts by weight of the alloy.

2. The alloy of claim 1, wherein the dual-phase microstructure is stable below about 1000° C.

3. The alloy of claim 1, wherein at least one of the first phase or the second phase are produced using ball milling, and wherein a combination of the first phase and the second phase are hot pressed and sintered to thereby produce the alloy.

4. The alloy of claim 1, wherein the first phase has a first lattice constant of about 0.75 nm and a second lattice constant of about 0.76 nm.

5. The alloy of claim 1, wherein the second phase has a first lattice constant of about 1.08 nm.

6. The alloy of claim 1, wherein the first phase is approximately 75 parts by weight and the second phase is approximately 25 parts by weight based on 100 parts by weight of the alloy.

7. A method comprising:
obtaining a first phase consisting of aluminum, iron, and silicon, the first phase defining a hexagonal close-packed structure having a stoichiometric ratio of $Al_4Fe_{1.7}Si$;
obtaining a second phase consisting of aluminum, iron, and silicon, the second phase defining a face-centered cubic structure having a stoichiometric ratio of $Al_3Fe_2Si$; and
combining the first phase and the second phase using solid-state processing to produce an alloy including a dual-phase microstructure, the dual-phase microstructure having a first-phase abundance greater than about 50 parts by weight and a second-phase abundance less than about 50 parts by weight based on 100 parts by weight of the alloy.

8. The method of claim 7, further comprising:
milling, prior to combining the first phase and the second phase, the first phase and the second phase to obtain a first-phase powder and a second-phase powder.

9. The method of claim 7, wherein combining the first phase and the second phase is accomplished using hot pressing and sintering.

10. The method of claim 7, wherein the first phase has a first lattice constant of about 0.75 nm and a second lattice constant of about 0.76 nm and wherein the second phase has a first lattice constant of about 1.08 nm.

11. The method of claim 7, wherein the first phase is approximately 75 parts by weight and the second phase is approximately 25 parts by weight based on 100 parts by weight of the alloy.

12. A vehicle component consisting of:
a ternary alloy having a dual-phase microstructure including:
a first phase defining a hexagonal close-packed structure having a stoichiometric ratio of $Al_4Fe_{1.7}Si$, and
a second phase defining a face-centered cubic structure having a stoichiometric ratio of $Al_3Fe_2Si$,
wherein the dual-phase microstructure is stable below about 800° C., and wherein the dual-phase microstructure has a first-phase abundance greater than about 50 parts by weight and a second-phase abundance less than about 50 parts by weight based on 100 parts by weight of the alloy.

13. The vehicle component of claim 12, wherein the dual-phase microstructure is stable below about 1000° C.

14. The alloy of claim 1, wherein the dual-phase microstructure is produced using powder metallurgy.

15. The vehicle component of claim 12, wherein at least one of the first phase or the second phase are produced using ball milling, and wherein a combination of the first phase and the second phase are hot pressed and sintered to thereby produce the ternary alloy.

16. The vehicle component of claim 12, wherein the first phase has a first lattice constant of about 0.75 nm and a second lattice constant of about 0.76 nm.

17. The vehicle component of claim 12, wherein the second phase has a first lattice constant of about 1.08 nm.

18. The vehicle component of claim 12, wherein the first phase is approximately 75 parts by weight and the second phase is approximately 25 parts by weight based on 100 parts by weight of the ternary alloy.

* * * * *